United States Patent
Hong et al.

(10) Patent No.: US 12,498,872 B2
(45) Date of Patent: Dec. 16, 2025

(54) STORAGE DEVICE CONFIGURED TO SELECTIVELY CHANGE A STREAM IDENTIFIER AND OPERATING METHOD OF STORAGE DEVICE

(71) Applicant: Samsung Electronics Co., Ltd., Suwon-si (KR)

(72) Inventors: Seongcheol Hong, Hwaseong-si (KR); Hyungkyun Byun, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 339 days.

(21) Appl. No.: 17/839,797

(22) Filed: Jun. 14, 2022

(65) Prior Publication Data
US 2022/0405000 A1     Dec. 22, 2022

(30) Foreign Application Priority Data
Jun. 21, 2021    (KR) ............ 10-2021-0080371

(51) Int. Cl.
*G06F 3/06*     (2006.01)

(52) U.S. Cl.
CPC .......... *G06F 3/0652* (2013.01); *G06F 3/0608* (2013.01); *G06F 3/0658* (2013.01); *G06F 3/0679* (2013.01)

(58) Field of Classification Search
CPC .... G06F 3/0652; G06F 3/0608; G06F 3/0658; G06F 3/0679; G06F 2212/7205; G06F 2212/7207; G06F 12/0246; G06F 12/0261
See application file for complete search history.

(56) References Cited

U.S. PATENT DOCUMENTS

| | | | | |
|---|---|---|---|---|
| 6,321,238 B1 * | 11/2001 | Putzolu | ............... | G06F 21/6227 |
| 6,341,340 B1 * | 1/2002 | Tsukerman | ............. | G06F 16/27 |
| | | | | 707/E17.007 |
| 7,610,437 B2 * | 10/2009 | Sinclair | ................. | G06F 3/0652 |
| | | | | 711/104 |

(Continued)

FOREIGN PATENT DOCUMENTS

KR    10-2020-0054600 A     5/2020

OTHER PUBLICATIONS

Extended European Search Report dated Nov. 17, 2022 for corresponding European Application No. 22179795.4.

(Continued)

*Primary Examiner* — Christopher D Birkhimer
(74) *Attorney, Agent, or Firm* — Harness, Dickey & Pierce, P.L.C.

(57) ABSTRACT

A storage device according to the technical ideas of the inventive concepts include: a memory device including a plurality of memory blocks, the plurality of memory blocks including a plurality of pages; a data controller configured to receive, from a host, data to be written to the plurality of pages and a stream identifier corresponding the data, and determine whether to change the stream identifier based on an age of the data representing a frequency of update on the data on one of the plurality of memory blocks or one of the plurality of pages; and a garbage collection controller configured to classify the data based on the stream identifier, and control a garbage collection operation of the memory device based on a classification result.

19 Claims, 13 Drawing Sheets

(56) References Cited

U.S. PATENT DOCUMENTS

| | | | | |
|---|---|---|---|---|
| 7,984,084 | B2* | 7/2011 | Sinclair | G06F 16/1847 707/818 |
| 8,285,918 | B2* | 10/2012 | Maheshwari | G11C 7/1072 711/159 |
| 8,443,263 | B2* | 5/2013 | Selinger | G06F 11/1068 714/768 |
| 8,873,284 | B2* | 10/2014 | Sinclair | G06F 12/0246 365/185.11 |
| 9,223,693 | B2* | 12/2015 | Sinclair | G06F 12/0246 |
| 9,336,133 | B2* | 5/2016 | Sinclair | G06F 12/0246 |
| 9,348,746 | B2* | 5/2016 | Sinclair | G06F 12/0246 |
| 9,465,731 | B2* | 10/2016 | Sinclair | G06F 12/0246 |
| 9,632,926 | B1 | 4/2017 | Souri et al. | |
| 9,734,050 | B2* | 8/2017 | Sinclair | G06F 12/0253 |
| 9,734,911 | B2* | 8/2017 | Sinclair | G06F 3/0658 |
| 9,778,855 | B2* | 10/2017 | Sinclair | G06F 3/064 |
| 10,108,345 | B2 | 10/2018 | Choi et al. | |
| 10,108,543 | B1* | 10/2018 | Duggal | G06F 11/14 |
| 10,108,544 | B1* | 10/2018 | Duggal | G06F 11/14 |
| 10,120,613 | B2* | 11/2018 | Sinclair | G06F 12/02 |
| 10,133,490 | B2* | 11/2018 | Sinclair | G06F 3/0655 |
| 10,255,179 | B2* | 4/2019 | Ji | G06F 3/0659 |
| 10,289,317 | B2 | 5/2019 | Tai et al. | |
| 10,430,279 | B1* | 10/2019 | Dittia | G06F 3/0656 |
| 10,452,281 | B2 | 10/2019 | Haines et al. | |
| 10,496,297 | B2 | 12/2019 | Bahirat et al. | |
| 10,719,495 | B2 | 7/2020 | Boles et al. | |
| 10,795,812 | B1* | 10/2020 | Duggal | G06F 3/067 |
| 10,983,715 | B2* | 4/2021 | Sharoni | G06Q 20/105 |
| 11,036,407 | B1* | 6/2021 | Tikoo | G06F 3/0653 |
| 11,086,537 | B2* | 8/2021 | Byun | G06F 3/0679 |
| 2006/0004957 | A1* | 1/2006 | Hand, III | G06F 12/0866 711/E12.019 |
| 2007/0033325 | A1* | 2/2007 | Sinclair | G06F 3/0608 711/170 |
| 2008/0082596 | A1* | 4/2008 | Gorobets | G06F 12/0253 |
| 2008/0189477 | A1* | 8/2008 | Asano | G06F 12/0246 711/E12.008 |
| 2009/0043831 | A1* | 2/2009 | Antonopoulos | G06F 3/0614 |
| 2009/0276588 | A1* | 11/2009 | Murase | G06F 3/0647 711/E12.071 |
| 2011/0145473 | A1* | 6/2011 | Maheshwari | G06F 12/12 711/E12.008 |
| 2011/0161784 | A1* | 6/2011 | Selinger | G06F 11/1016 714/E11.002 |
| 2014/0325148 | A1* | 10/2014 | Choi | G06F 3/0659 711/114 |
| 2014/0365719 | A1* | 12/2014 | Kuzmin | G06F 12/0246 711/103 |
| 2015/0227602 | A1* | 8/2015 | Ramu | G06F 11/1456 707/634 |
| 2016/0246713 | A1* | 8/2016 | Choi | G06F 3/0608 |
| 2017/0123655 | A1* | 5/2017 | Sinclair | G06F 3/061 |
| 2018/0189175 | A1* | 7/2018 | Ji | G06F 3/0679 |
| 2018/0307598 | A1 | 10/2018 | Fischer et al. | |
| 2019/0243771 | A1 | 8/2019 | Mittal et al. | |
| 2019/0377494 | A1* | 12/2019 | Rao | G06F 12/0246 |
| 2020/0089420 | A1* | 3/2020 | Sharoni | G06Q 20/354 |
| 2020/0097403 | A1* | 3/2020 | Saxena | G06F 12/0246 |
| 2020/0150892 | A1 | 5/2020 | Kim et al. | |
| 2020/0174668 | A1 | 6/2020 | Byun | |
| 2020/0183588 | A1* | 6/2020 | Lee | G06F 3/0649 |
| 2020/0310686 | A1* | 10/2020 | Truong | G06F 3/061 |
| 2021/0019255 | A1 | 1/2021 | Akin et al. | |
| 2021/0109856 | A1 | 4/2021 | Lee et al. | |
| 2021/0173558 | A1* | 6/2021 | Kashyap | G06N 20/00 |
| 2021/0173776 | A1* | 6/2021 | Li | G06F 12/1009 |
| 2021/0181996 | A1* | 6/2021 | Lin | G06F 3/0652 |
| 2021/0342362 | A1* | 11/2021 | Haravu | G06F 11/1464 |

OTHER PUBLICATIONS

European Office Action dated Sep. 27, 2023 for corresponding European Patent Application 22179795.4.

* cited by examiner

STORAGE DEVICE CONFIGURED TO SELECTIVELY CHANGE A STREAM IDENTIFIER AND OPERATING METHOD OF STORAGE DEVICE

CROSS-REFERENCE TO RELATED APPLICATION

This application is based on and claims priority under 35 U.S.C. § 119 to Korean Patent Application No. 10-2021-0080371, filed on Jun. 21, 2021, in the Korean Intellectual Property Office, the disclosure of which is incorporated by reference herein in its entirety.

BACKGROUND

The inventive concepts relate to a storage device, and more particularly, to a storage device including a memory device and a memory controller, and/or an operating method of the storage device.

Storage devices using a non-volatile memory device, such as a solid state driver (SSD), a non-volatile memory express (NVMe), an embedded multi-media card (eMMC), and a universal flash storage (UFS) have been widely used.

As data is continuously written to flash memory, valid data may be scattered over the entire flash memory, and to secure free memory blocks, i.e., data storage spaces to which data may be written, garbage collection, by which valid pages of at least one memory block are moved to another memory block, and an erase operation is performed on the former memory block. A block of a memory device may include data of various features, and if cold data, which is not subject to frequent updates, and hot data, which is subject to frequent updates, are stored in the same memory block, as hot data may be updated frequently, to perform garbage collection, cold data may also be moved to other memory blocks and copied several times. Accordingly, the efficiency of the garbage collection may decline, and as the more frequently the garbage collection is performed, the more the life of a storage device may decrease, data needs to be classified accurately according to features of the data.

SUMMARY

The inventive concepts provide a storage device configured to classify data to perform garbage collection efficiently. According to an aspect of the inventive concepts, there is provided a storage device configured to classify data to perform garbage collection efficiently.

According to another aspect of the inventive concepts, there is provided a storage device including: a memory device including a plurality of memory blocks, the plurality of memory blocks including a plurality of pages; a data controller configured to receive, from a host, data to be written to the plurality of pages and a stream identifier corresponding to the data, and determine whether to change the stream identifier based on an age of the data representing a frequency of update on the data on a page or block basis (e.g., for one of the memory blocks or one of the pages); and a garbage collection controller configured to classify the data based on the stream identifier, and control a garbage collection operation of the memory device based on a classification result.

According to another aspect of the inventive concepts, there is provided a storage device including: a memory device including a plurality of memory blocks, the plurality of memory blocks including a plurality of pages; a data manager configured to receive, from a host, data to be written to the plurality of pages and N stream identifiers corresponding to the data, and group the stream identifiers into M new stream identifiers where M is less than N; a data controller configured to change the new stream identifiers based on an age of the data representing a frequency of update on the data on a page or block basis; and a garbage collection controller configured to classify the data based on the changed new stream identifiers, and control a garbage collection operation of the memory device based on a classification result.

According to another aspect of the inventive concepts, there is provided an operating method of a storage device including a memory device, the method including: receiving, from a host, data and a stream identifier corresponding to the data; determining whether to change the stream identifier based on an age of the data representing a frequency of update on the data; determining whether to classify the data based on the stream identifier and classifying the data; and performing a garbage collection operation of the memory device based on a classification result.

BRIEF DESCRIPTION OF THE DRAWINGS

Embodiments of the inventive concepts will be more clearly understood from the following detailed description taken in conjunction with the accompanying drawings in which.

DETAILED DESCRIPTION OF THE EMBODIMENTS

Hereinafter, embodiments of the inventive concepts will be described in detail with reference to the accompanying drawings.

Figure 1:
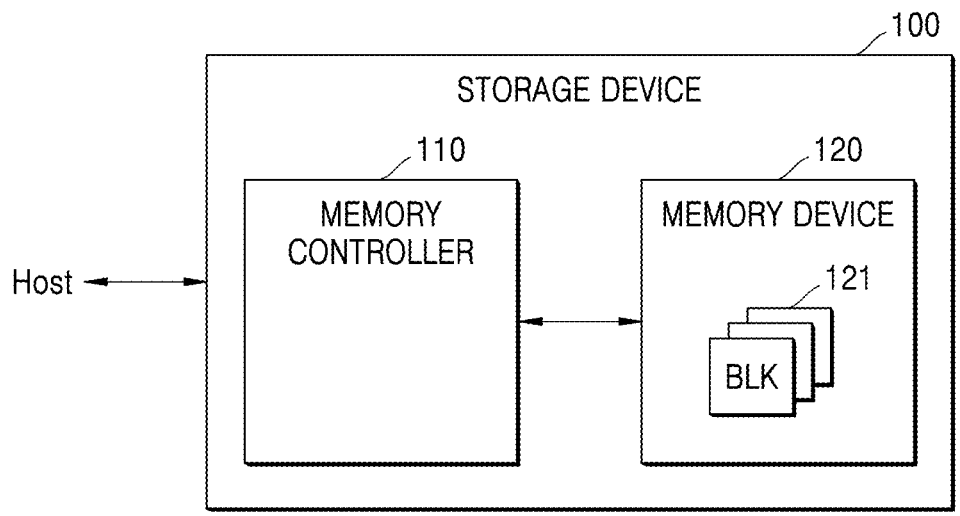
FIG. 1 is a block diagram of a storage device according to an example embodiment.

FIG. 1 is a block diagram of a storage device according to an example embodiment.

With reference to FIG. 1, a storage device 100 may include a memory controller 110 and a memory device 120. The storage device 100 may store data received from a host. According to an example embodiment, the storage device 100 may classify features of data to be stored and rearrange the stored data based on the classified data.

The storage device 100 may reclassify data classified from the host based on an update frequency of the data. The storage device 100 may store the classified data in the same or adjacent data storage area. The storage area may refer to a logical or physical storage space inside the storage device 100, such as a sector, a page, a block, etc.

In an example embodiment, the storage device 100 may be an embedded memory provided in a storage system. In an example embodiment, the storage device 100 may be an embedded multi-media card (eMMC) or embedded universal flash storage (UFS) memory device. In an example embodiment, the storage device 100 may be an external memory removable from a storage system. For example, the storage device 100 may be a UFS memory card, a compact flash (CF) memory card, a secure digital (SD) memory card, a micro-SD memory card, a mini-SD memory card, an extreme digital (xD) memory card, or a memory stick, but the inventive concepts are not limited thereto.

The storage device 100 may include the memory controller 110 and the memory device 120. The memory device 120 may include a plurality of memory blocks BLK 121.

The memory controller 110 may control the storage device 100 in general. The memory controller 110 may control the memory device 120 to read data stored in the memory device 120 or to program data to the memory device 120 in response to a read request or a write request from the host. In an example embodiment, the memory controller 110 may control a program operation, a read operation, and an erase operation on the memory device 120 by providing an address, a command, and a control signal to the memory device 120. In addition, the data for programming data to the memory device 120 according to a request from the host and the read data may be transmitted and received between the memory controller 110 and the memory device 120.

The memory controller 110 may receive, from the host, data and a stream identifier corresponding to the data. A stream identifier Stream ID may be assigned by the host according to an expected life, a frequency of use, etc. For example, the memory controller 110 may receive, from the host, a write request including data and a stream identifier.

The memory controller 110 may determine whether to change the stream identifier based on an age of the data representing a frequency of update on the data. The older the age of the data is, the less frequently the data is updated, and such data may be referred to as cold data. The younger the age of the data is, the more frequently the data is updated, and such data may be referred to as hot data. For example, the memory controller 110 may change stream identifiers respectively corresponding to each piece of data having similar ages to the same stream identifier. Even if a stream identifier corresponding to data has been received from the host, the memory controller 110 may change the stream identifier based on an age of the data. As the memory controller 110 may change the stream identifier assigned from the host based on the age of the data, the data classified by the host may be classified more accurately by the memory controller 110.

The memory controller 110 may classify data based on a determination on whether to change a stream identifier. The memory controller 110 may collect data having the same stream identifier. For example, the memory controller 110 may store pieces of data having a stream identifier corresponding to cold data in the same block. The memory controller 110 may control the garbage collection operation of the memory device 120 based on a classification result. For example, by hardly performing the garbage collection on the block in which the data having the stream identifier corresponding to cold data is stored, the data stored in the block may not be copied to another block frequently, and the garbage collection costs may be reduced. The memory controller 110 is described below in detail with reference to FIG. 3.

The memory device 120 may include a non-volatile memory device. In an example embodiment, the memory device 120 may be a device employing various types of memories, such as NAND-type flash memory, magnetic random-access memory (MRAM), spin-transfer torque MRAM, conductive bridging RAM (CBRAM), ferroelectric RAM (FeRAM), phase RAM (PRAM), resistive RAM, nanotube RAM, polymer RAM (PoRAM), nano floating gate memory (NFGM), holographic memory, molecular electronic electronics memory, insulator resistance change memory, etc.

In an example embodiment, the memory device 120 may include flash memory, and the flash memory may include a two-dimensional (2D) NAND memory array or a 3D NAND (or a vertical NAND: VNAND) memory array. The 3D memory array may be formed in a monolithic manner at arrays of memory cells having an active area arranged on a silicon substrate, or at least one physical level of a circuit formed on or in the substrate and related to operations of the memory cells. The term "monolithic" may mean that layers of each level constituting the array are stacked directly on each lower level of the array. In one embodiment, the 3D memory array may include VNAND strings arranged in a vertical direction allowing at least one memory cell to be arranged on another memory cell. The at least one memory cell may include a charge trap layer.

The memory device 120 may include a plurality of memory blocks BLK 121. Each of the plurality of memory blocks BLK 121 may include at least one page, and each page may include a plurality of memory cells connected to a plurality of word lines. Data may be written to the page. In an example embodiment, the memory device 120 may include a plurality of planes including the plurality of memory blocks BLK 121, particularly a plurality of memory dies respectively including the plurality of planes.

The memory device 120 may include a single level cell SLC storing 1-bit data or multi-level cell MLC storing multi-bit data (for example, data of 2 or more bits.) For example, the memory device 120 may include a triple level cell TLC which may store 3-bit data, a quadruple level cell QLC capable of storing 4-bit data, or a memory cell capable of storing data of 5 or more bits.

In an example embodiment, the host may provide a command to the storage device 100 and transmit and receive data with the storage device 100. In an example embodiment, the host may provide a write command and write data to the storage device 100. In an example embodiment, the host may transmit a read command to the storage device 100 and receive read data from the storage device 100.

The host may include at least one processor core or may be implemented as a System-on-Chip (SoC). For example, the host may include a general-purpose processor and a dedicated processor. The host may be a processor itself or may correspond to an electronic device or system including a processor. In an example embodiment, the host may correspond to a central processing unit (CPU), a processor, a microprocessor, or an application processor (AP), etc.

The host and the memory device 120 may transmit and receive data with each other, i.e., interface with each other according to a specified standard. For example, various interface methods, such as advanced technology attachment (ATA), serial ATA (SATA), external SATA (e-SATA), small computer small interface (SCSI), serial attached SCSI (SAS), parallel advanced technology attachment (PATA), peripheral component interconnection (PCI), PCI-Express (PCI-E), IEEE 1394, universal serial bus (USB), secure digital (SC) card, multi-media card (MMC), eMMC, compact flash (CF) card interface, enhanced small disk interface (ESDI), integrated drive electronics (IDE), mobile industry processor interface (MIPI), etc. may be applied to an interface for communication between the memory device 120 and the host, but the inventive concepts are not limited thereto.

The memory controller 110 and the memory device 120 may transmit and receive commands, addresses, and data through one or more channels. Through which channel and in which storage area of the memory device 120 a command transmitted from the host is to be executed may be determined by a logical address transmitted from the host. Hereinafter, a logical block address LBA may be referred to as a logical address.

Figure 2:
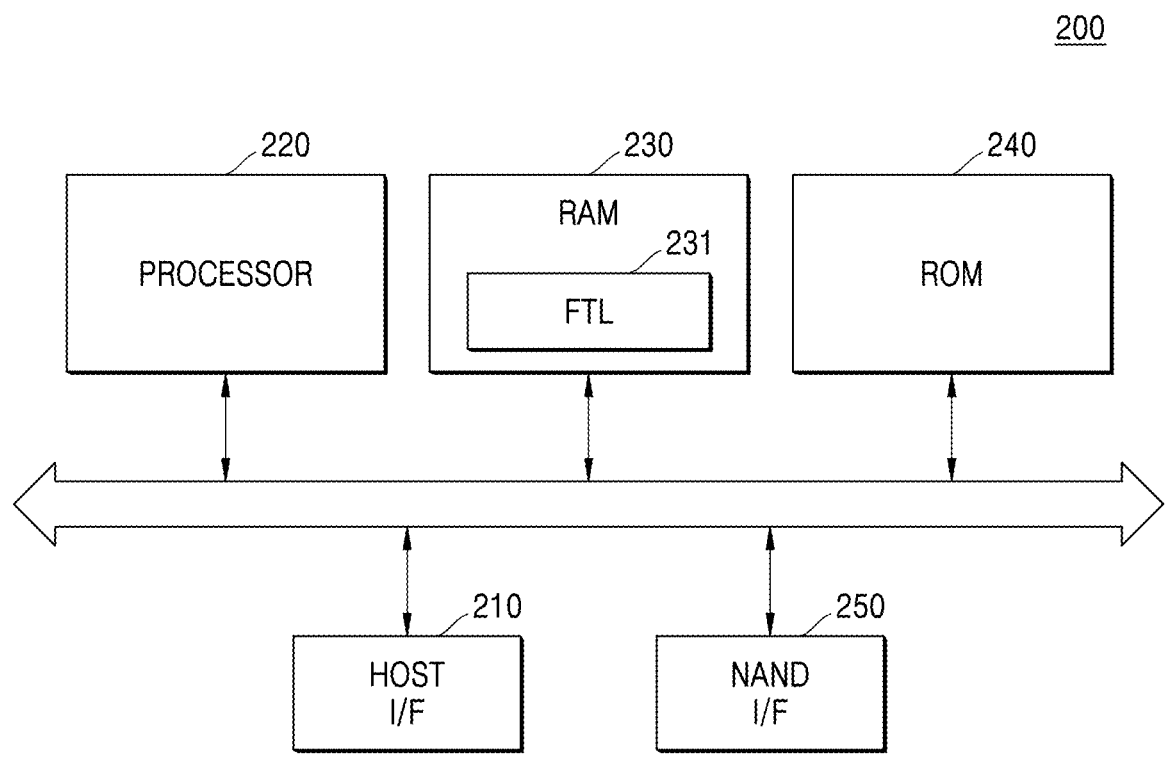
FIG. 2 is a block diagram of a memory controller according to an example embodiment.

FIG. 2 is a block diagram of a memory controller according to an example embodiment.

A memory controller 200 may include a host interface 210, a processor 220, RAM 230, read-only memory (ROM) 240, and a NAND interface 250. As the memory controller 200 of FIG. 2 corresponds to the memory controller 110 of FIG. 1, redundant descriptions thereon are omitted.

The memory controller 200 may receive a command provided from the host, and the memory controller 200 may access a memory device (e.g., the memory device 120 of FIG. 1) in response to the command. The memory controller 200 may control read, program, and erase operations of the memory device in response to a command input from the host. The command may include a read request, a write request, etc. According to a write request of the host, the memory controller 200 may control the memory device to immediately program data or to erase previously programmed data and then program data.

The host interface 210, the processor 220, the RAM 230, the ROM 240, and the NAND interface 250 may be electrically connected via a bus. The bus may refer to a transmission line for transmitting information among the components of the memory controller 200. The memory controller 200 may further include other components in addition to the ones above.

The host interface 210 may have a data exchange protocol between the host and the memory controller 200. Accordingly, various devices may be connected to the host interface 210 as a host. In an example embodiment, the host interface 210 may provide an interface with the memory controller 200 in correspondence with a bus format of the host. The bus format of the host may include USB, SCSI, PCI-E, ATA, PATA, SATA, SAS, etc. In an example embodiment, the host interface 210 may employ an NVMe protocol applied to a host device exchanging data by the PCI-E method.

The processor 220 may control overall operations of a storage device (e.g., the storage device 100 of FIG. 1.). Specifically, the processor 220 may decode a command received from the host and control the storage device to perform an operation according to a result of decoding.

The processor 220 may provide a read command and an address to the memory device during a read operation in response to a read request, and provide a write command, an address, and write data to the memory device during a write operation in response to a write request.

The processor 220 may perform a process of converting a logical address received from the host into a physical page address using metadata stored in the memory controller 200. Here, the metadata may be understood as management information generated by the storage device to manage the memory device. Hereinafter, a physical page address or a physical block address may be referred to as a physical address.

The processor 220 may control a flash translation layer (FTL) 231 so that a logical address transmitted with a read/write request from the host may be converted into a physical address for a read/write operation. The process of converting the logical address into a physical address may be performed by the FTL 231. The processor 220 may perform garbage collection, address mapping, wear leveling, etc. in the FTL 231 to manage the memory device by executing firmware loaded to the ROM 240. The FTL 231 is described below in detail with reference to FIG. 3.

The RAM 230 may temporarily store data transmitted from the host, data generated by the processor 220, and/or data read from the memory device. Software or firmware for operation of the storage device may be loaded to the RAM 230 from the ROM 240. In addition, the RAM 230 may store metadata read from the memory device. The RAM 230 may be implemented as dynamic-RAM (DRAM), static-RAM (SRAM), etc.

The RAM 230 may include the FTLr 231. The FTL 231 may be a component capable of mapping each address between a file system and the memory device. In an example embodiment, the FTL 231 may convert a logical block address (LBA) of the host into a physical block address (PBA) of the memory device.

The ROM 240 may be read-only memory for storing a program executed by the processor 220. The ROM 240 may store a program for realizing an operating method of the memory controller 200 or firmware to which such program is recorded.

The NAND interface 250 may control signals for driving the memory device and access the memory device according to the control by the processor 220. The NAND interface 250 may selectively perform software and hardware interleave operations through at least one channel.

Figure 3:
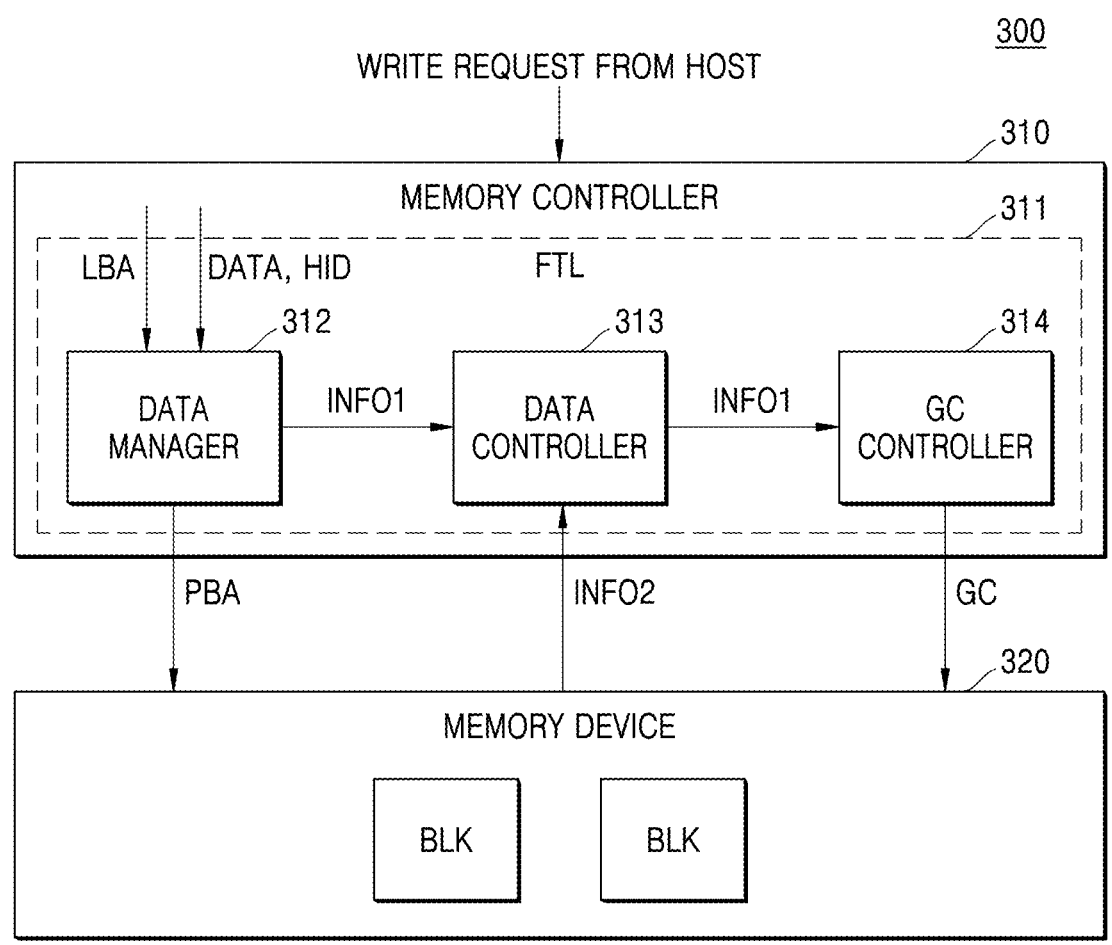
FIG. 3 is a block diagram for explaining configuration of a storage device according to an example embodiment.

FIG. 3 is a block diagram of a storage device according to an example embodiment.

With reference to FIG. 3, a FTL 311 may include a data manager 312, a data controller 313, and a garbage collection controller GC controller 314. As the storage device 300 and the memory device 320 of FIG. 3 correspond to the storage device 100 and the memory device 120 of FIG. 1, respectively, and the memory controller 310 and the FTL 311 of FIG. 3 correspond to the memory controller 200 and the FTL 231 of FIG. 2, respectively, redundant descriptions thereon are omitted. Hereinafter, the memory device 320 may be described as a flash memory device (i.e., an NVM).

The FTL 311 may provide an interface to hide an erase operation of the memory device 320 between the file system of the host and the memory device 320. The weaknesses of the memory device 320, which are erase-before-write and discrepancy between an erase unit and a write unit, and the weakness of the flash memory, which is a limitation on the maximum number of erases, etc. may be supplemented by the FTL 311. The following operations by the FTL 311 may be performed by executing at least parts of the FTL 311 by the processor.

The mapping to allocate an LBA generated by the file system of the host to a PBA of the memory device 320 during a write operation of the memory device 320 may be performed in the FTL 311. By the FTL 311, the number of writes per block of the memory device 320 may be counted, and the wear leveling to distribute the writes so that the degree of write may be equal among the plurality of blocks may be performed. Also, by the FTL 311, the garbage collection to rearrange data to resolve the issue of an increased invalid area InValid (i.e., garbage) due to repeated data write/erase carried out on the storage area may be performed. According to an example embodiment, write data DATA may be classified based on the write data DATA, timestamp information of the memory device 320, and a stream identifier HID corresponding to the write data DATA, and based on the classification result, the garbage collection may be performed on the memory device 320. Accordingly, the invalid area InValid may be converted into a valid area Valid.

The data manager 312 may receive the write data DATA and an LBA of the write data DATA in response to a write request from the host and provide a PBA for the LBA to the memory device 320 based on a mapping table stored in RAM (e.g., the RAM 230 of FIG. 2) or ROM (e.g., the ROM 240 of FIG. 2).

According to an example embodiment, the data manager 312 may receive data received continuously from the host and the stream identifier HID corresponding to the data. For example, the data manager 312 may receive the write data DATA.

In one embodiment, the data manager 312 may group N stream identifiers HID into M new stream identifiers NID. M may be a positive integer less than N. The stream identifier HID may refer to a stream identifier which the host has assigned according to features of the write data DATA, and the new stream identifier NID may refer to a stream identifier which is newly assigned by grouping the stream identifier HID assigned by the host. The number of stream identifiers HID assigned from the host may be different from the number of stream identifiers HID the storage device 300 may manage. The data manager 312 may group N stream identifiers HID into M stream identifiers HID that may be managed by the storage device 300, and M may refer to the number of streams the storage device 300 may manage. The data manager 312 may group the stream identifiers HID into the new stream identifiers NID based on the write data DATA and information on the stream identifier HID. Accordingly, the storage device 300 may manage the streams efficiently.

For example, the data manager 312 may group the stream identifiers HID into the new stream identifiers NID based on a file extension of the write data DATA. The data may be arranged in the memory block BLK based on the new stream identifier NID. The data of the same new stream identifier NID may be stored in the same memory block BLK. For example, if the stream identifier HID received from the host is 0 to 5, as for the stream identifier HID of 0, 1 or 2, the new stream identifier NID may be grouped into "a," and as for the stream identifier HID of 3, 4, or 5, the new stream identifier NID may be grouped into "b." The data of which the new stream identifier NID corresponds to "a" may be stored in a first block, and the data of which the new stream identifier NID corresponds to "b" may be stored in a second block.

The data manager 312 may provide first information INFO1 to the data controller 313. The first information INFO1 may include at least one of the write data DATA, the stream identifier HID, and the new stream identifier NID, but the inventive concepts are not necessarily limited thereto.

The data controller 313 may receive the write data DATA and the stream identifier HID and determine whether to change the stream identifier HID based on an age of the data. The data controller 313 may receive the first information INFO1 from the data manager 312 and receive second information INFO2 from the memory device 320. The age of the data may represent a frequency of update on the write data DATA on a page or block basis and may be generated based on the second information INFO2.

The second information INFO2 may refer to timestamp information of the memory device 320. The second information INFO2 may include first timestamp information, which is timestamp information of the memory device 320 at a time point when the write data DATA is stored in the memory device 320, and second timestamp information, which is timestamp information of the memory device 320 at a current write time point when the data controller 313 accesses the write data DATA stored in the memory device 320. The timestamp information may include at least one of a host write amount with respect to the memory device 320, an erase count for a block BLK, and time information.

The age of the write data DATA may be generated by using the first timestamp information at a time point when the write data DATA is stored in the memory device 320 and the second timestamp information at the current write time point. The age of the write data DATA may be generated based on a difference between the first timestamp information and the second timestamp information. For example, the age of the write data DATA may be generated by the data controller 313 based on a time difference between the time point when the write data DATA is stored in the memory device 320, and the current write time point, but the inventive concepts are not limited thereto, and the age of the write data DATA may be generated through various methods. The older the age of the write data DATA is, the less frequently the write data DATA may be updated, and the younger the age of the write data DATA is, the more frequently the write data DATA may be updated.

The data controller 313 may change the stream identifier HID if (or based on) the age of the write data DATA is greater than or equal to a threshold value. In one embodiment, the data controller 313 may change the stream identifier HID to a first stream identifier corresponding to cold data if (or based on) the age of the write data DATA is greater than or equal to the threshold value. If the age of the write data DATA is greater than or equal to the threshold value, the write data DATA may be cold data, which is not subject to frequent updates. In this case, the data controller 313 may change the stream identifier HID assigned from the host to a stream identifier corresponding to cold data by comparing the age of the write data DATA to the threshold value.

The data controller 313 may maintain the stream identifier HID if the age of the write data DATA is less than the threshold value. However, the inventive concepts are not necessarily limited thereto, and the data controller 313 may change the stream identifier HID to a stream identifier corresponding to hot data if the age of the write data DATA is less than the threshold value.

The data controller 313 may change the stream identifier HID according to an age range of the write data DATA. For example, the age of the write data DATA may be divided into three subranges, and as the stream identifier HID respectively corresponds to each subrange of the write data DATA, there may be three types of the stream identifier HID. The stream identifier HID may be changed to a stream identifier corresponding to a range including an age of the data DATA. However, the number of types of the stream identifier HID is not necessarily limited thereto, and there may be five or six types of corresponding stream identifier according to the age range of the write data DATA.

In one embodiment, the data controller 313 may determine whether to change the stream identifier HID based on a difference between a host write amount at the current write time point and a host write amount at the time point when the write data DATA is stored in the memory device 320. The host write amount may refer to an amount of the write data DATA stored in the memory device 320 in response to a write request from the host. The age of the write data DATA may be generated based on the difference between the host write amount at the time point when the write data DATA is stored in the memory device 320 and the host write amount at the current write time point. For example, when a host write amount is generated in the amount of 20 GB at the time point when the write data DATA is stored in the memory device 320, and a host write amount is generated in the amount of 100 GB at the current write time point, the age of the write data DATA may correspond to 80 GB. Assuming that the threshold value is 70 GB, as the age of the write data DATA is 80 GB, which is greater than the threshold value, the data controller 313 may change the stream identifier HID to the first stream identifier.

In one embodiment, the data controller 313 may determine whether to change the stream identifier HID based on a difference between an erase count at the current write time point and an erase count at the time point when the write data DATA is stored in the memory device 320. The erase count may refer to the number of erases of a block BLK in which the write data DATA is stored. For example, if an erase count at the current write time point is 1000, and an erase count at the time point when the write data DATA is stored in the memory device 320 is 30 where a threshold value is 800, the data controller 313 may change the stream identifier HID to the first stream identifier corresponding to cold data because the difference between the erase counts is 970, which is greater than the threshold value.

In one embodiment, the data controller 313 may determine whether to change the stream identifier HID based on a time difference between the current write time point and the time point when the write data DATA is stored in the memory device 320. For example, if the time difference between the current write time point and the time point when the write data DATA is stored in the memory device 320 is two years, and the threshold value is one year, the data controller 313 may change the stream identifier HID to the first stream identifier because the time difference is greater than the threshold value.

If the stream identifiers HID are grouped into the new stream identifiers NID by the data manager 312, the data controller 313 may determine whether to change the new stream identifier NID based on the age of the write data DATA. The data controller 313 may determine whether to change the new stream identifier NID in the same way as it determines whether to change the stream identifier HID as described above.

The data controller 313 may change the new stream identifier NID to a first new stream identifier corresponding to cold data if the age of the write data DATA is greater than or equal to the threshold value.

The data controller 313 may determine whether to change the new stream identifier NID based on the age of the write data DATA generated by using the first timestamp information and the second timestamp information.

The GC controller 314 may classify the write data DATA based on the stream identifier HID and control the garbage collection operation of the memory device 320 based on the classification result. The garbage collection controller 314 may classify the write data DATA by receiving the first information INFO1 from the data controller 313. The stream identifier HID included in the first information INFO1 may be changed by the data controller 313.

The garbage collection controller 314 may collect data of the same stream identifier HID. The garbage collection controller 314 may classify data of the same stream identifier HID by storing the write data DATA of the same stream identifier HID in the same memory block BLK. The garbage collection controller 314 may collect the write data DATA corresponding to the first stream identifier. The garbage collection controller 314 may classify the write data DATA corresponding to the first stream identifier as a first data group. For example, the garbage collection controller 314 may classify as the first data group the write data DATA corresponding to the first stream identifier by storing them in a free block to which no data is written.

The garbage collection controller 314 may determine whether to classify the write data DATA based on the stream identifier HID. In one embodiment, each of the memory blocks BLK may include at least one page, and the garbage collection controller 314 may rearrange, if the number of pages in which data corresponding to the first stream identifier is stored is greater than or equal to a threshold value, the pages in which the data corresponding to the first stream identifier is stored in at least one of the memory blocks BLK.

The garbage collection controller 314 may count the number of pages in which the write data DATA corresponding to the first stream identifier is stored, and if the number of counted pages is greater than or equal to a threshold value, the garbage collection controller 314 may rearrange the pages in which the data corresponding to the first stream identifier is stored in at least one of the memory blocks BLK. The page in which the data corresponding to the first stream identifier is stored may be understood as a page to which cold data is written, i.e., a cold page. For example, the garbage collection controller 314 may count the number of pages in which the data corresponding to the first stream identifier is stored, and if the number of counted pages is greater than or equal to a threshold value, the garbage collection controller 314 may collect the pages in which the data corresponding to the first stream identifier is stored in at least one of the free blocks.

The garbage collection controller 314 may classify the write data DATA by receiving the first information INFO1 including the new stream identifier NID from the data controller 313. The garbage collection controller 314 may collect data of the same new stream identifier NID. The garbage collection controller 314 may classify data of the same new stream identifier NID by storing the write data DATA of the same new stream identifier NID in the same memory block BLK. The garbage collection controller 314 may determine whether to classify the write data DATA based on the new stream identifier NID.

The garbage collection controller 314 may provide a garbage collection signal GC to the memory device 320 based on a classification result of the write data DATA. In response to the garbage collection signal GC, the garbage collection may be performed in the memory device 320, and the data stored in the memory block BLK may be rearranged. The memory device 320 may copy valid data of the memory block BLK in which the write data DATA not corresponding to the first stream identifier is stored to a free page in another memory block BLK and erase the former memory block BLK in which the write data DATA not corresponding to the first stream ID is stored. In this manner, the memory block BLK may be rearranged.

The garbage collection may be performed by selecting a block having a minimum number of valid pages and arranging the valid pages as one block. According to a comparative example, the garbage collection based on the minimum number of valid pages may be performed regardless of features of data. Accordingly, if cold data, which is not frequently changed, is widely distributed in a storage area of a memory device, the garbage collection may be performed repeatedly. Given the physical characteristic of storing electrons in a transistor in a memory cell to store data, the memory device has a limitation on the number of writes, and thus, if the garbage collection is performed repeatedly, the life of the memory device may be reduced.

According to the technical ideas of the inventive concepts, the stream identifier HID may be changed based on the age of the data, the data may be classified based on the changed stream identifier HID, and the garbage collection may be performed based on the classification result. Therefore, the storage device 300 according to the technical ideas of the inventive concepts may reduce the number of performances of garbage collections by performing the garbage collection based on the result of data classification according to its age, and as a result, a write amplification factor (WAF) may also decrease.

Accordingly, the life or performance of the storage device 300 including the memory device 320 may be improved. Further, the improvement in write operation performance of the storage device 300 and the life extension may be expected. Hereinafter, the WAF may refer to a value calculated based on a ratio of data requested by the host to data actually written to the memory device 320.

Figure 4:
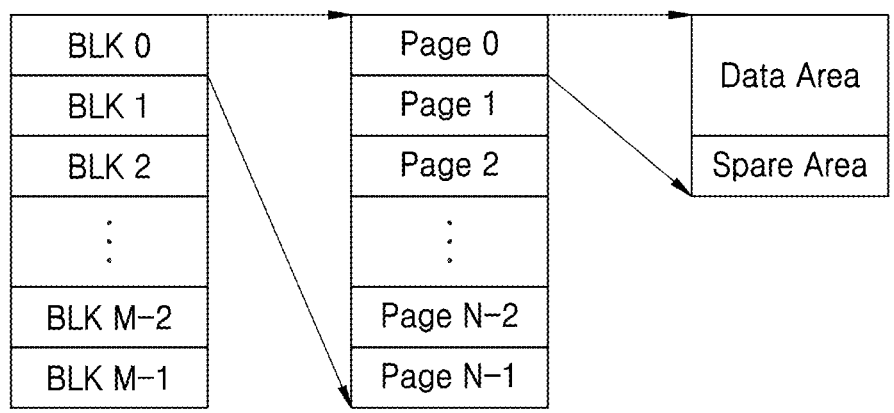
FIG. 4 is a conceptual diagram illustrating a structure of data stored in a memory device according to an example embodiment.

FIG. 4 is a conceptual diagram illustrating a structure of data stored in a memory device according to an example embodiment.

A memory device (e.g., the memory device 320 of FIG. 3) may include a plurality of memory blocks BLK. Each of the plurality of memory blocks BLK may include at least one page, and each page may include a plurality of memory cells connected to a plurality of word lines. The memory cells may include at least one transistor, and the transistor may store data by storing electrons.

For example, the memory device may include M memory blocks (BLK 0 to BLK M−1, M is a natural number). In a storage device (e.g., the storage device 100 of FIG. 1), read and write operations may be performed on a page (or a sector) basis, but an erase operation may be performed on a block basis.

One memory block BLK may include N pages (Page 0 to Page N−1). The write data DATA input to the storage device may be stored in a valid page or a free page that exists in one of at least one memory block BLK of the memory device.

One page may be divided into a data area in which data is stored and a spare area in which data is not stored. In an example embodiment, 2 KB (kilo-byte) may be allocated to the data area, and 64 B (byte) may be allocated to the spare area, but the inventive concepts are not limited thereto.

Figure 5:
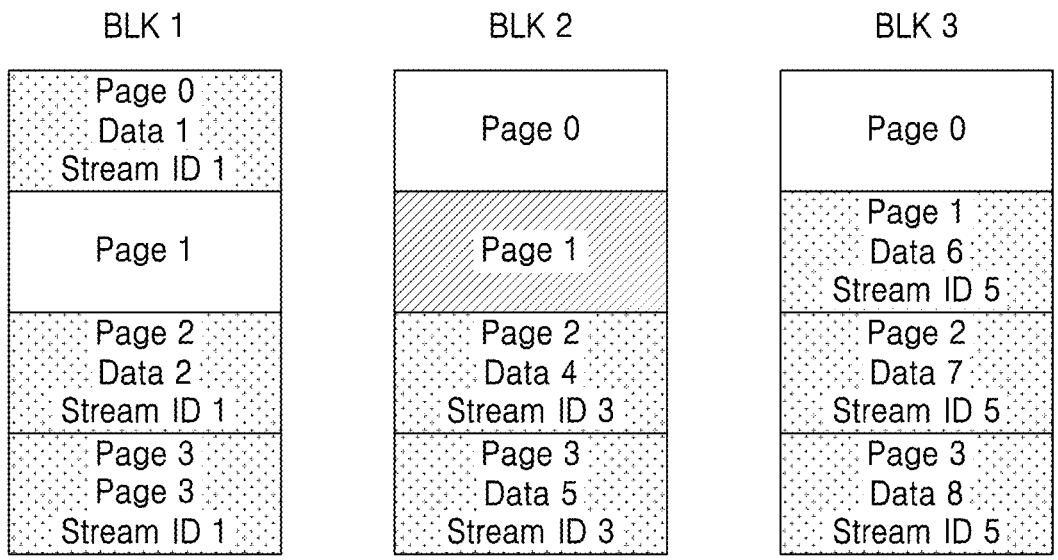
FIGS. 5 and 6 are diagrams for explaining an operation in which a stream identifier is changed according to an example embodiment.
Figure 5:
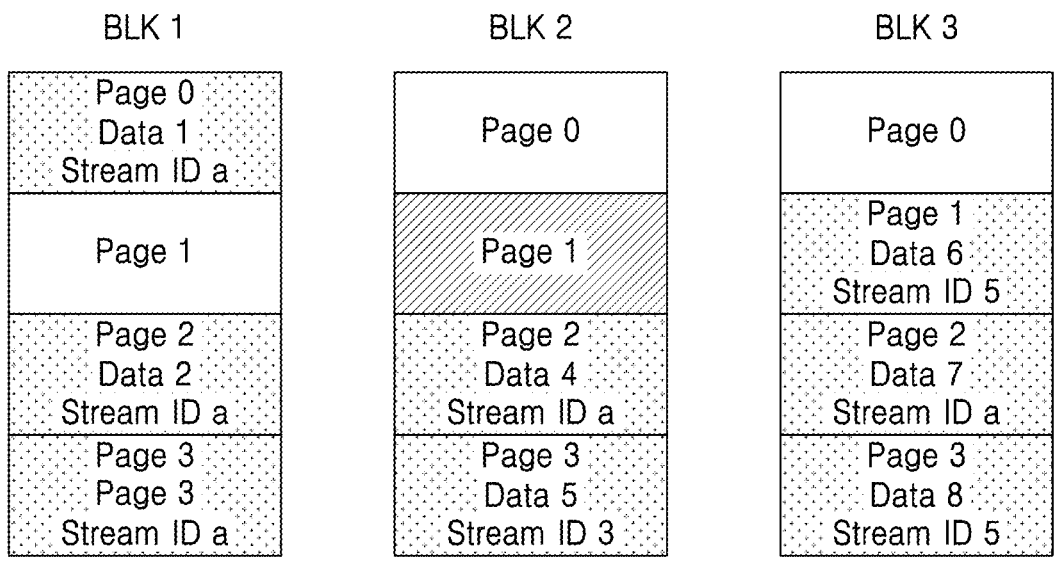
Figure 6:
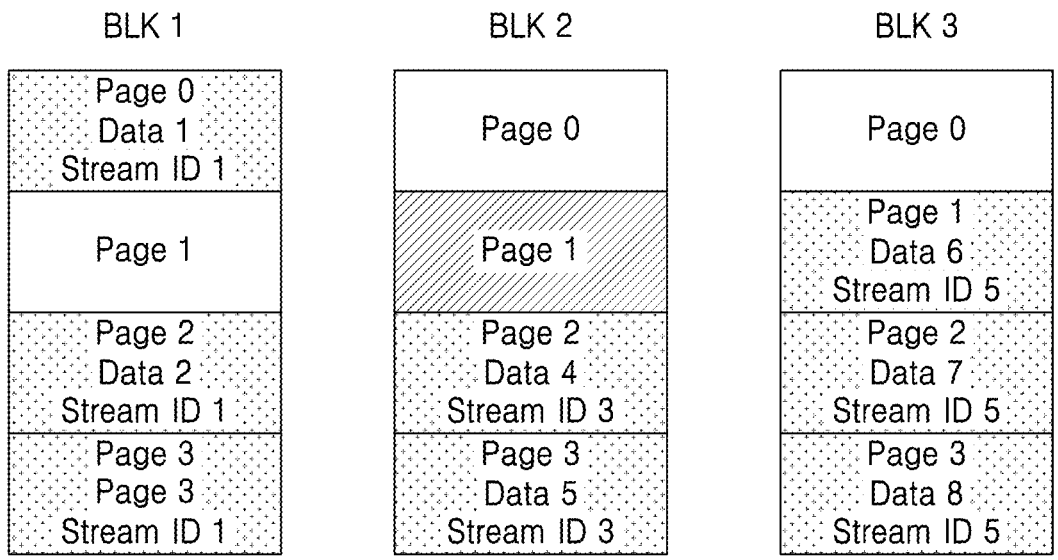
Figure 6:
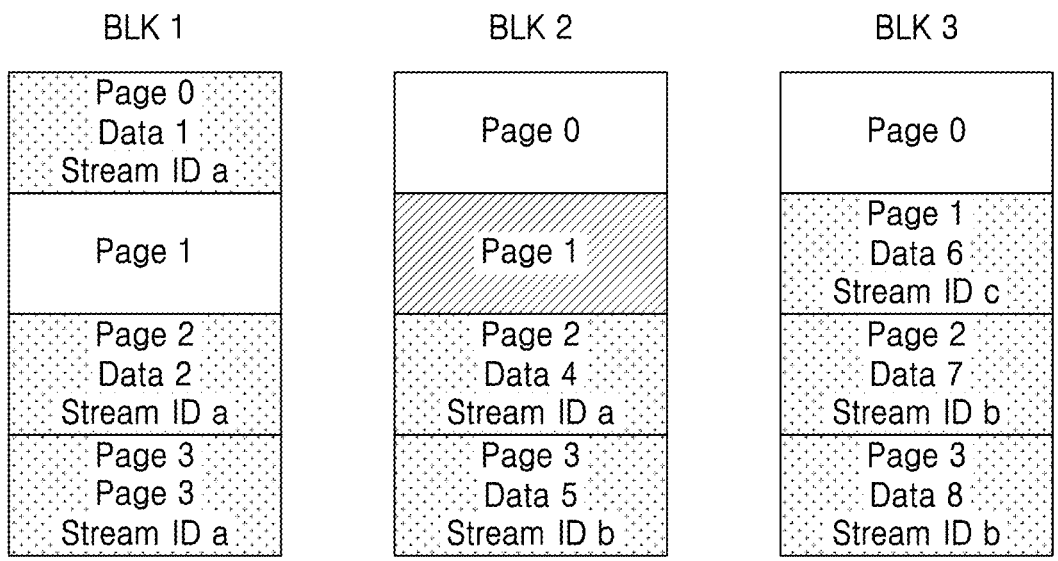

FIGS. 5 and 6 are diagrams for explaining an operation in which a stream identifier is changed according to an example embodiment.

For convenience in explanation, it is assumed that each of first to third memory blocks BLK 1, BLK 2, and BLK 3 of the storage area of the memory device has first to fourth pages Page 0 to Page 3.

FIGS. 5 and 6 illustrate a method of changing a stream identifier assigned by a host based on an age of data.

With reference to FIG. 5, a data controller (e.g., the data controller 313 of FIG. 3) may change a stream identifier to a first stream identifier Stream ID a corresponding to cold data if an age of data is greater than or equal to a threshold value.

Hereinafter, it is assumed that ages of data Data 1, data Data 2, data Data 3, data Data 4, and data Data 7 are greater than or equal to a threshold value. The data Data 1 may be stored in the page Page 0 of the memory block BLK 1, the data Data 2 may be stored in the page Page 2, the data Data 3 may be stored in the page Page 3, and the page Page 1 may be a free area. As the age of each of the data Data 1, the data Data 2, and the data Data 3 is greater than or equal to the threshold value, the stream identifier Stream ID 1 may be changed to the first stream identifier Stream ID a.

The data Data 4 may be stored in the page Page 2 of the memory block BLK 2, the data Data 5 may be stored in the page Page 3, the page Page 0 may be a free area, and the page Page 1 may be an invalid area due to repeated data read/write. As the age of the data Data 4 is greater than or equal to the threshold value, the stream identifier Stream ID 3 may be changed to the first stream identifier Stream ID a.

Similarly, the data Data 6 may be stored in the page Page 1 of the memory block BLK 3, the data Data 7 may be stored in the page Page 2, the data Data 8 may be stored in the page Page 3, and the page Page 0 may be a free area. As the age of the data Data 7 is greater than or equal to the threshold value, the stream identifier Stream ID 5 may be changed to the first stream identifier Stream ID a.

With reference to FIG. 6, a data controller (e.g., the data controller 313 of FIG. 3) may change the stream identifier to the first stream identifier Stream ID a if the age of the data is greater than or equal to a first threshold value, change the stream identifier to the second stream identifier Stream ID b if the age of the data is less than the first threshold value and greater than or equal to a second threshold value, and change the stream identifier to the third stream identifier Stream ID c if the age of the data is less than the second threshold value. The stream identifier may be changed according to an age range of data. The age range of data may be divided into three subranges by using two threshold values; however, the age range of data is not necessarily limited thereto.

The first stream identifier Stream ID a, the second stream identifier Stream ID b, and the third stream identifier Stream ID c may correspond to data having a higher update frequency in this stated order. The data corresponding to the first stream identifier Stream ID a may be older than the data corresponding to the second stream identifier Stream ID b, and the data corresponding to the second stream identifier Stream ID b may be older than the data corresponding to the stream identifier Stream ID c. For example, the first stream identifier Stream ID a may correspond to cold data which is not frequently changed, the second stream identifier Stream ID b may correspond to warm data which is changed more frequently than the cold data, and the third stream identifier Stream ID c may correspond to hot data which is changed more frequently than the warm data.

With reference to FIG. 6, the data Data 1 may be stored in the page Page 0 of the memory block BLK 1, the data Data 2 may be stored in the page Page 2, the data Data 3 may be stored in the page Page 3, and the page Page 1 may be a free area. If (or based on) the age of each of the data Data 1, the data Data 2, and the data Data 3 is greater than or equal to the first threshold value, the stream identifier Stream ID 1 may be changed to the first stream identifier Stream ID a.

The data Data 4 may be stored in the page Page 2 of the memory block BLK 2, the data Data 5 may be stored in the page Page 3, the page Page 0 is a free area, and the page Page 1 may be an invalid area. If the age of the data Data 4 is greater than or equal to the first threshold value, the stream identifier Stream ID 3 may be changed to the first stream identifier Stream ID a, and if the age of the data Data 5 is less than the first threshold value and greater than or equal to the second threshold value, the stream identifier Stream ID 3 may be changed to the second stream identifier Stream ID b.

Similarly, the data Data 6 may be stored in the page Page 1 of the memory block BLK 3, the data Data 7 may be stored in the page Page 2, the data Data 8 may be stored in the page Page 3, and the page Page 0 may be a free area. As the age of the data Data 6 is less than the second threshold value, the stream identifier Stream ID 5 may be changed to the third stream identifier Stream ID c, and if the ages of the data Data 7 and the data Data 8 are less than the first threshold value and greater than or equal to the second threshold value, the stream identifier Stream ID 5 may be changed to the second stream identifier Stream ID b.

Figure 7:
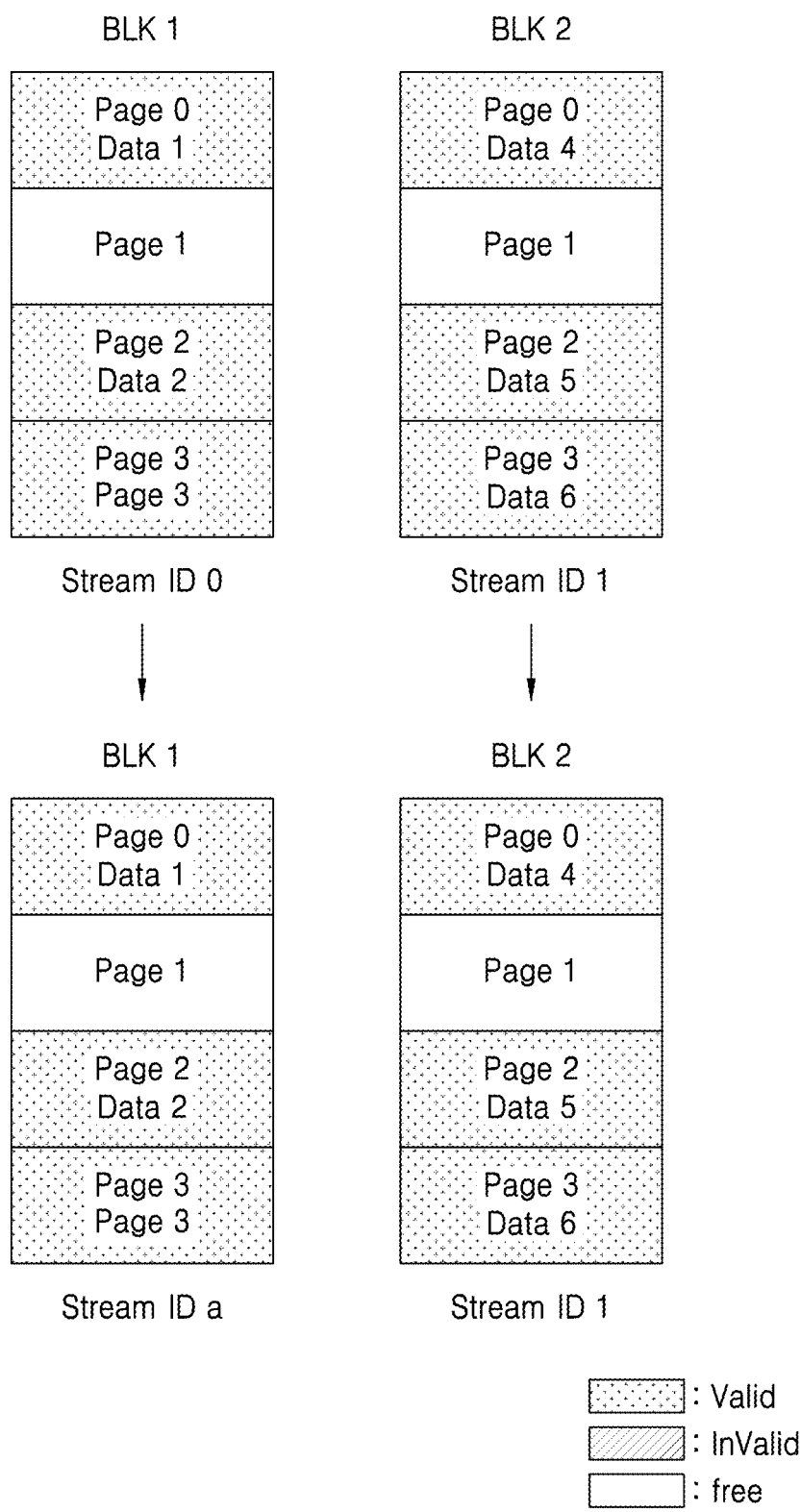
FIG. 7 is a diagram for explaining a stream identifier on a block basis according to an example embodiment.

FIG. 7 is a diagram for explaining a stream identifier on a block basis according to an example embodiment.

With reference to FIG. 7, all data stored in the memory block BLK 1 may have a stream identifier Stream ID 0, and all data stored in the memory block BLK 2 may have the stream identifier Stream ID 1. The data having the same stream identifier assigned by the host may be collected in the same memory block. The data controller may change the stream identifier on a memory block basis. If all of the ages of the data stored in the memory block are greater than or equal to the threshold value, the stream identifiers corresponding to the data stored in the memory block may be changed all at once.

In the memory block BLK 1, if the ages of the data Data 1, the data Data 2, and the data Data 3 are all greater than or equal to the threshold value, the stream identifier Stream ID 0 may be changed to the first stream identifier Stream ID a all at once.

In the memory block BLK 2, if at least one the ages of the data Data 4, the data Data 5, and the data Data 6 is less than the threshold value, the stream identifier Stream ID 1 may not be changed.

Figure 8:
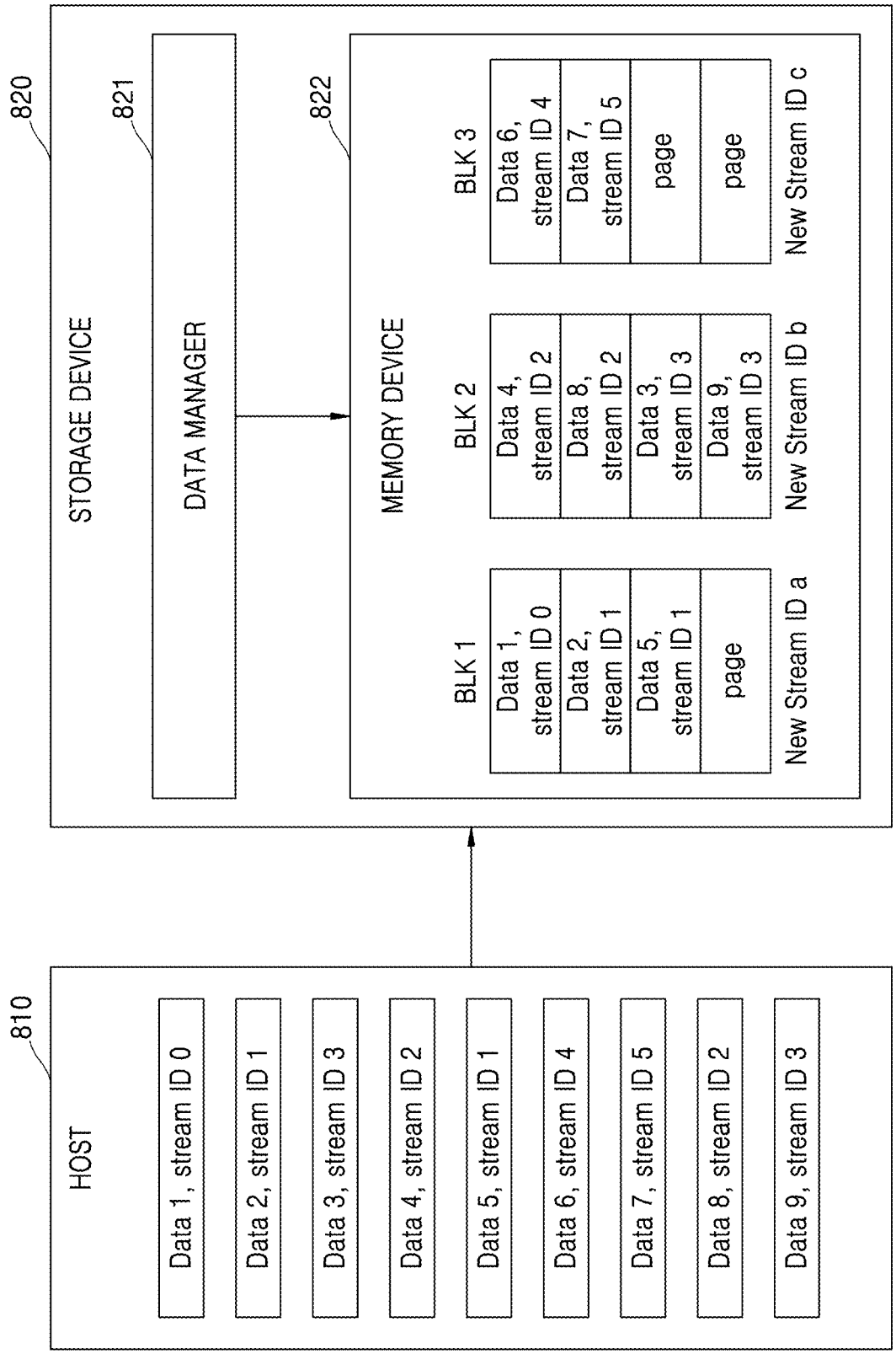
FIG. 8 is a diagram for explaining an operation in which a stream identifier is assigned according to an example embodiment.

FIG. 8 is a diagram for explaining an operation in which a stream identifier is assigned according to an example embodiment.

With reference to FIG. 8, a storage device 820 may include a data manager 821 and a memory device 822, and as the storage device 820 of FIG. 8 corresponds to the storage device 300 of FIG. 3, redundant descriptions thereon are omitted.

A host 810 may assign a stream identifier to data. The data manager 821 may group N stream identifiers into M new stream identifiers. The data may be arranged in memory blocks based on the new stream identifier. FIG. 8 illustrates the operation of grouping nine stream identifiers into three new stream identifiers.

The data manager 821 may assign a first new stream identifier New Stream ID a to a stream identifier stream ID 0 corresponding to the data Data 1, a stream identifier stream ID 1 corresponding to the data Data 2, and a stream identifier stream ID 1 corresponding to the data Data 5. For example, the data Data 1, the data Data 2, and the data Data 5 may be stored in the memory block BLK 1 as metadata.

The data manager 821 may assign a second new stream identifier New Stream ID b to a stream identifier stream ID 2 corresponding to the data Data 4, a stream identifier stream ID 2 corresponding to the data Data 8, a stream identifier stream ID 3 corresponding to the data Data 3, and a stream identifier stream ID 3 corresponding to the data Data 9. For example, the data Data 4, the data Data 8, the data Data 3, and the data Data 9 may be stored in the memory block BLK 2 as temporary data.

The data manager may assign a third new stream identifier New Stream ID c to a stream identifier stream ID 4 corresponding to the data Data 6, and a stream identifier stream ID 5 corresponding to the data Data 7. For example, the data Data 6 and the data Data 7 may be stored in the memory block BLK 7 as user data.

Figure 9:
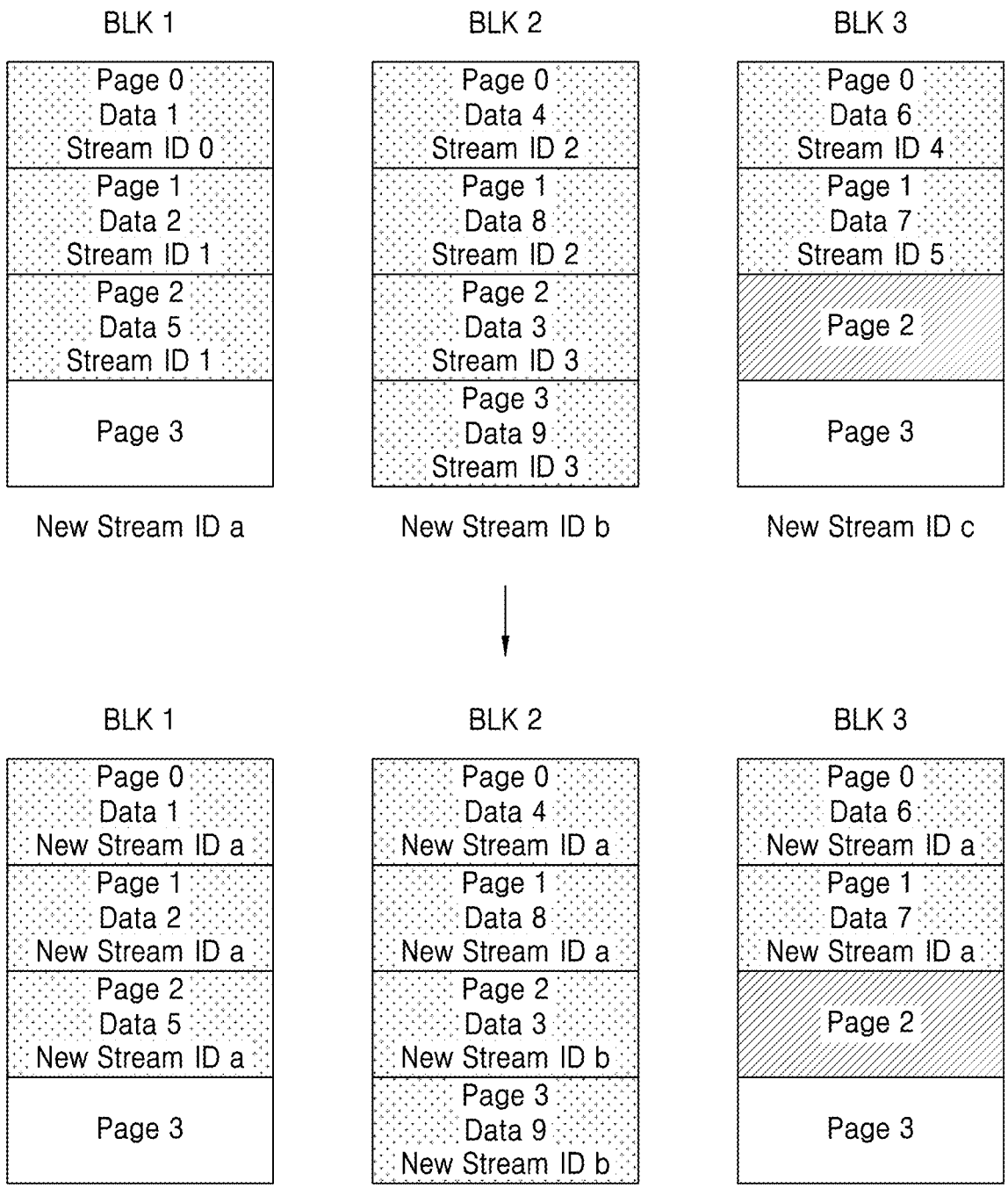
FIG. 9 is a diagram for explaining an operation in which a new stream identifier is changed according to an example embodiment.

FIG. 9 is a diagram for explaining an operation in which a new stream identifier is changed according to an example embodiment. FIG. 9 follows FIG. 8, and redundant descriptions thereon are omitted.

FIG. 9 illustrates a method of changing a new stream identifiers New Stream ID obtained by grouping stream identifiers Stream ID assigned by a host based on an age of data.

With reference to FIG. 9, the data Data 1, the data Data 2, and the data Data 5 stored in the memory block BLK 1 may correspond to the first new stream identifier New Stream ID a, the data Data 4, the data Data 8, the data Data 3, and the data Data 9 stored in the memory block BLK 2 may correspond to the second new stream identifier New Stream ID b, and the data Data 6 and the data Data 7 stored in the memory block BLK 3 may correspond to the third new stream identifier New Stream ID c.

A data controller (e.g., the data controller 313 of FIG. 3) may change the new stream identifier if an age of data is greater than or equal to a threshold value.

If the data Data 4 is stored in the page Page 0 of the memory block BLK 2, the data Data 8 is stored in the page Page 1, the data Data 3 is stored in the page Page 2, the data Data 9 is stored in the page Page 3, and the ages of the data Data 4 and the data Data 8 are greater than or equal to the threshold value, the second new stream identifier New Stream ID b may be changed to the first new stream identifier New Stream ID a. The first new stream identifier New Stream ID a may refer to a new stream identifier corresponding to cold data.

If the data Data 6 is stored in the page Page 0 of the memory block BLK 3, the data Data 7 is stored in the page Page 1, the page Page 2 is an invalid area, the page Page 3 is a free area, and the ages of the data Data 6 and the data Data 7 are greater than or equal to the threshold value, the third new stream identifier New Stream ID c may be changed to the first new stream identifier New Stream ID a.

Figure 10:
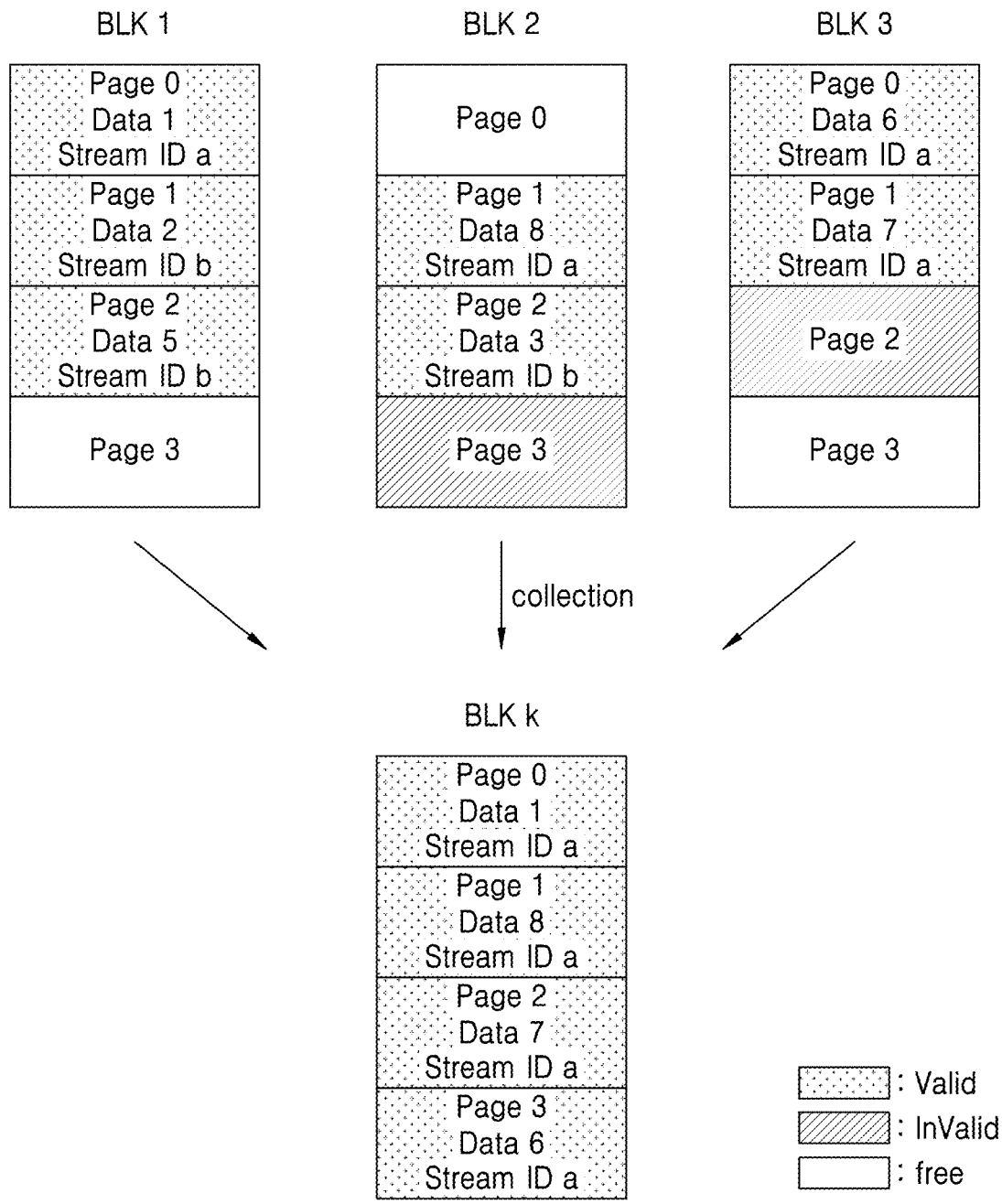
FIG. 10 is a diagram for explaining an operation in which data is classified according to an example embodiment.

FIG. 10 is a diagram for explaining an operation in which data is classified according to an example embodiment.

With reference to FIG. 10, data having the same stream identifier may be collected. A garbage collection controller (e.g., the garbage collection controller 314 of FIG. 3) may classify data having the same stream identifier by storing the data having the same stream identifier in the same memory block. Then, based on the classified data, the garbage collection may be performed.

In one embodiment, the garbage collection controller may identify and count the number of pages in which data corresponding to the first stream identifier is stored, and if the number of counted pages is greater than or equal to the threshold value, the garbage collection controller may rearrange the pages in which the data corresponding to the first stream identifier is stored in at least one memory block. Hereinafter, descriptions are made under the assumption that the threshold value is 3.

The data Data 1, the data Data 8, the data Data 7, and the data Data 6 corresponding to the first stream identifier Stream ID a may be stored in four pages, and as the number of pages, i.e., 4, is greater than or equal to the threshold value, i.e., 3, the data corresponding to the first stream identifier Stream ID a may be stored in the memory block BLK k. By storing the data corresponding to the first stream identifier Stream ID a in the memory block BLK k, the data may be classified.

If the first stream identifier Stream ID a corresponds to cold data, cold data may be collected in the memory block BLK k. By performing the garbage collection based on classification results, cold data may not be copied frequently to a free area, and the garbage collection cost may be reduced.

Figure 11:
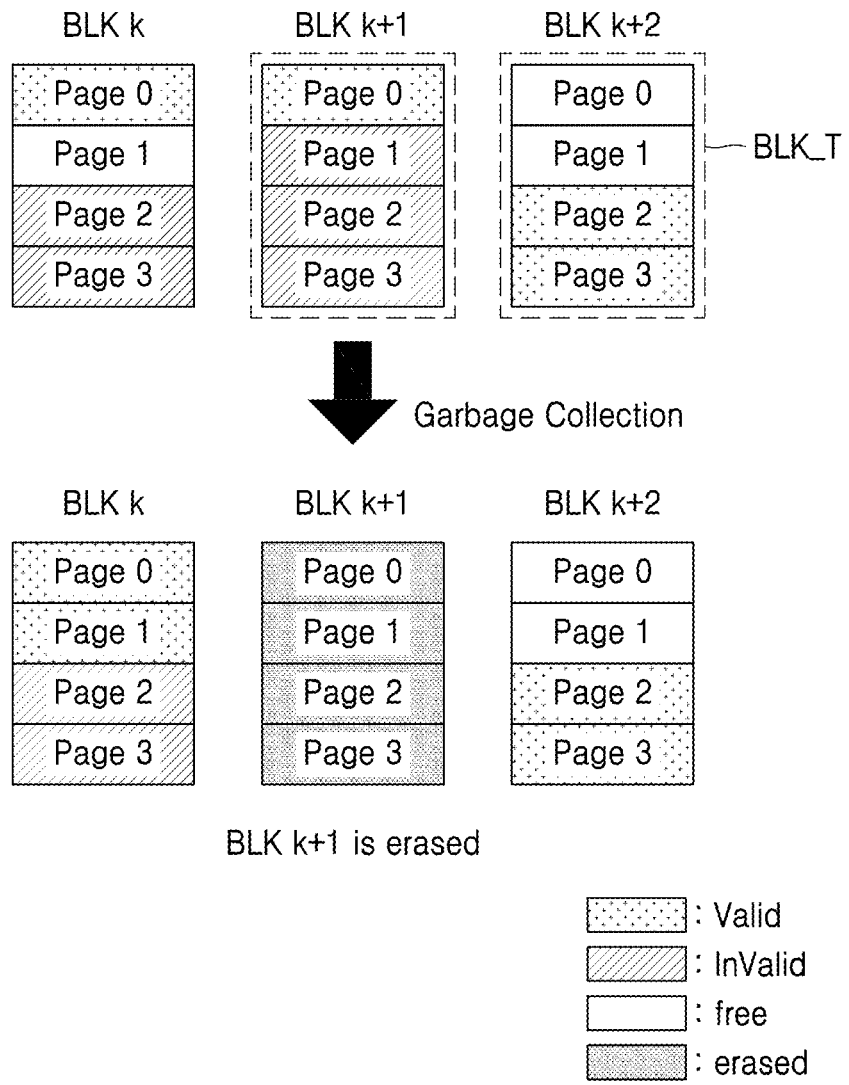
FIG. 11 is a conceptual diagram illustrating garbage collection performed in a memory device according to an example embodiment.

FIG. 11 is a conceptual diagram illustrating garbage collection performed in a memory device according to an example embodiment.

With reference to FIG. 11, a page Page 0 of the memory block BLK k may be a valid area to which data may be written validly, a page Page 1 may be a free area, a page Page 2 and a page Page 3 may be invalid areas to which data cannot be written due to repeated data write/erase.

Similarly, a page Page 0 of a memory block BLK k+1 may be a valid area, a page Page 1 to a page Page 3 may be invalid areas.

A page Page 0 and a page Page 1 of a memory block BLK k+2 may be free areas, and a page Page 2 and a page Page 3 may be valid areas. Cold data corresponding to the first stream identifier may be stored in the memory block BLK k+2, and hot data not corresponding to the first stream identifier may be stored in the memory block BLK k and BLK k+1.

In response to the garbage collection signal, the garbage collection may be performed in the memory device, and the data stored in the memory block may be rearranged. Specifically, the data stored in the page Page 0 of the memory block BLK k+1 may be hot data and may be copied to the page Page 1 of the memory block BLK k. Accordingly, the data stored in the memory block BLK k+1 may be considered meaningless. Therefore, the storage device may render the entire memory block BLK k+1 writable again by erasing the memory block BLK k+1. In addition, the storage device may not erase the memory block BLK k+2. In other words, the garbage collection may be performed. The data may be divided into hot data, which is frequently changed, and cold data, which is not frequently changed. Compared to the hot data, the cold data is less likely to be an invalid block because data erase and write may not be repeated as much as the hot data. If cold data is scattered in the memory block BLK, fragmentation of the data may be caused.

If an overwrite is performed on the memory blocks, previously written data may be erased, and new data may be written. At this time, according to features of data, there may be some blocks which are not completely erased. That is, as there may be invalid blocks, generation of free blocks may be suppressed. Accordingly, the garbage collection operation may be required.

A storage device (e.g., the storage device 300 of FIG. 3) according to the technical ideas of the inventive concepts may change a stream identifier based on an age of data, representing a frequency of update to the data, and classify the data according to the frequency of update to the data based on the stream identifier. The garbage collection may be performed based on the classification result. As data having similar update frequencies is written to the same memory block, the data may be erased completely by the garbage collection or erase operations performed afterwards, and more free blocks may be generated. The generation of free blocks may ultimately reduce the number of garbage collections, or the WAF.

Figure 12:
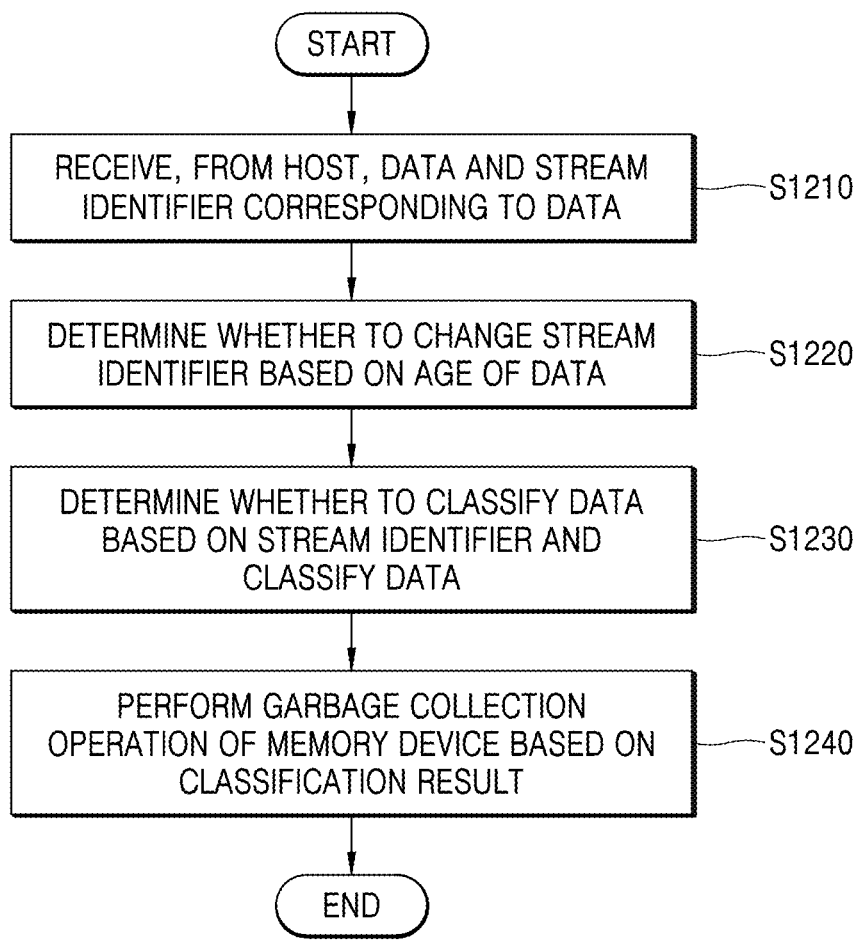
FIG. 12 is a flowchart for explaining an operating method of a storage device according to an example embodiment.

FIG. 12 is a flowchart for explaining an operating method of a storage device according to an example embodiment.

In operation S1210, the storage device may receive, from a host, data and a stream identifier corresponding to the data.

In operation S1220, the storage device may determine whether to change the stream ID based on an age of the data representing a frequency of update on the data. In one embodiment, the storage device may compare the age of the data to a first threshold value and determine whether to change the stream identifier based on the comparison result. If the age of the data is greater than or equal to the first threshold value, the storage device may change the stream identifier to the first stream identifier corresponding to cold data.

The age of the data may be generated by using timestamp information of a memory device at a time point when the data is stored in the memory device, and timestamp information of the memory device at a current write time point when a data controller accesses the data stored in the memory device.

In operation S1230, the storage device may determine whether to classify data based on the stream identifier and classify the data. The storage device may count the number of pages in which data corresponding to the first stream identifier is stored and compare the number of counted pages to a second threshold value. If the number of counted pages is greater than or equal to the second threshold value, the storage device may rearrange the pages in which the data corresponding to the first stream identifier is stored.

In operation S1240, the storage device may perform a garbage collection operation on the memory device based on a classification result.

Figure 13:
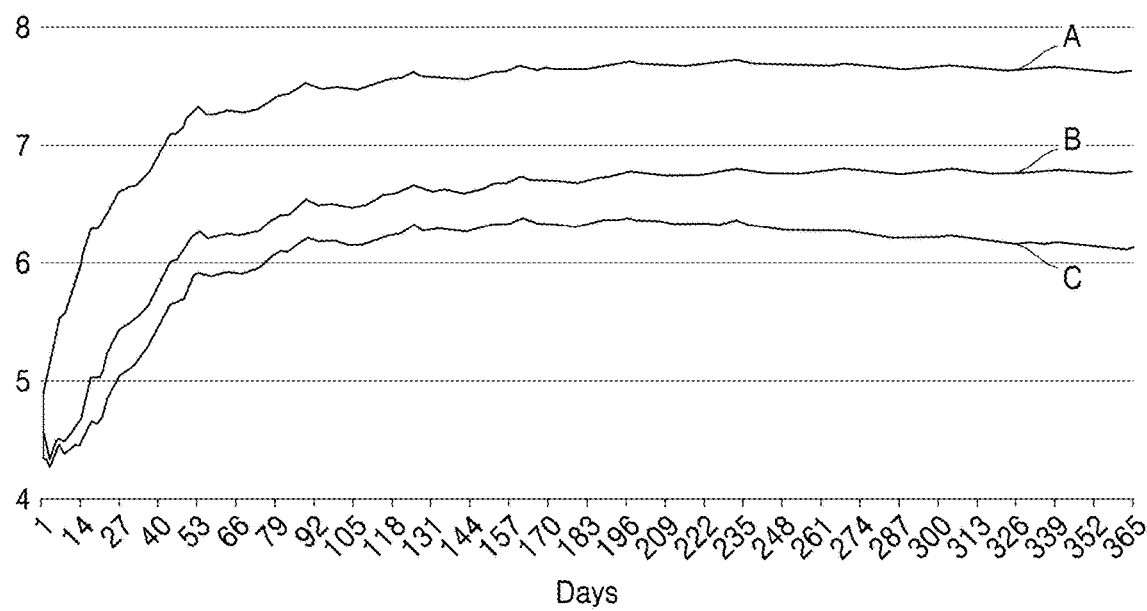
FIG. 13 is a graph showing results of experiments using a storage device according to an example embodiment.

FIG. 13 is a graph showing results of experiments using a storage device according to an example embodiment.

With reference to FIG. 13, the horizontal axis of the graph may represent days, and the vertical axis may represent WAFs. The first graph A represents WAFs if garbage collection is performed without classification of stream identifiers, the second graph B represents WAFs if garbage collection is performed based on stream identifiers assigned by a host, and the third graph C represents WAFs if garbage collection is performed based on data classified by a storage device according to the inventive concepts.

The second graph B may have smaller WAFs than the first graph A, and the third graph C may have smaller WAFs than the second graph B. Further, as the third graph C shows a decrease of WAF, it is understood that using a storage device according to the inventive concepts may lead to improved WAF.

Figure 14:
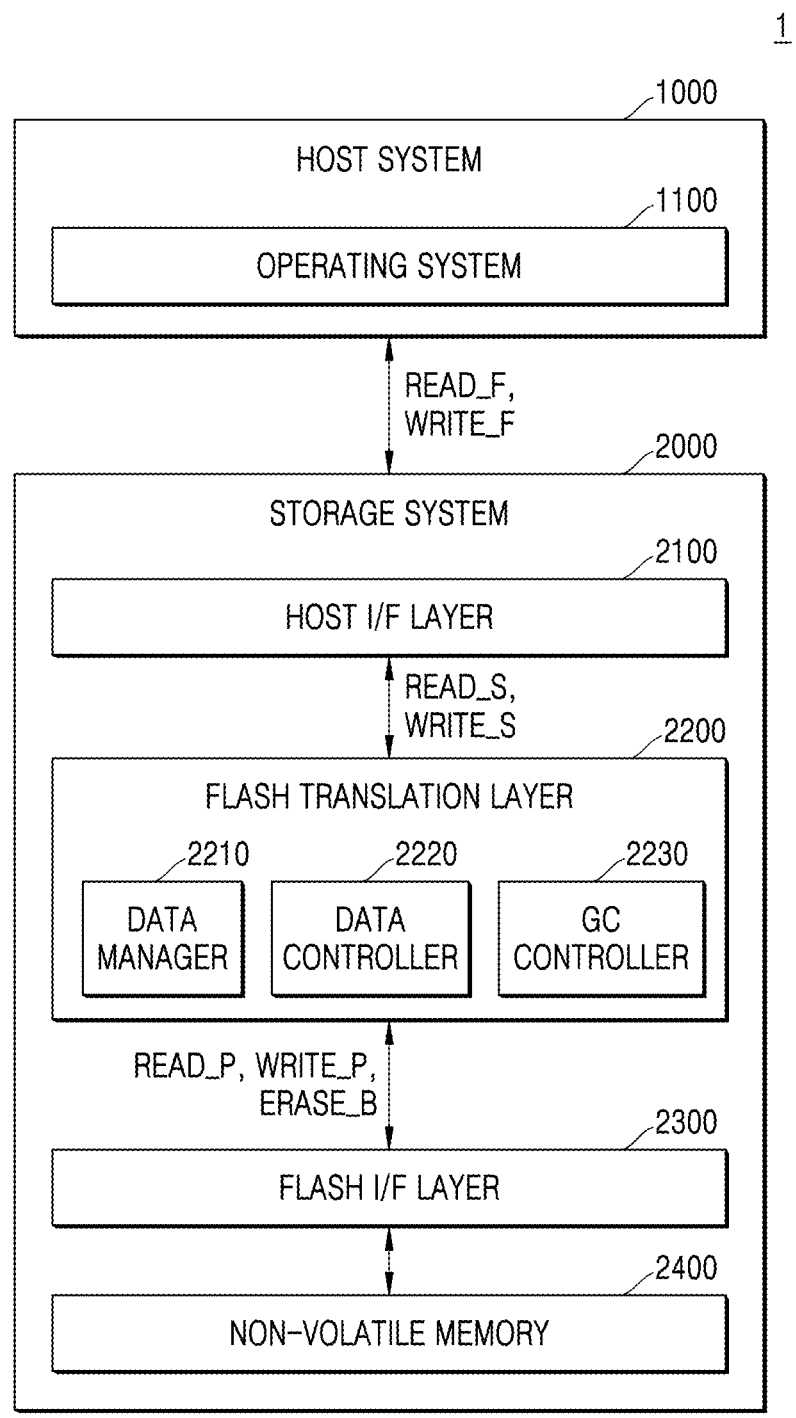
FIG. 14 is a block diagram of a memory system according to an example embodiment.

FIG. 14 is a block diagram of a memory system according to an example embodiment.

A host system 1000 and a storage system 2000 may constitute a memory system 1. For example, the memory system 1 may constitute a ultra mobile PC (UMPC), workstation, net-book, personal digital assistants (PDA), portable computer, web tablet, tablet computer, wireless phone, mobile phone, smart phone, e-book, portable multimedia player (PMP), portable game player, navigation, black box, digital camera, digital multimedia broadcasting (DMB) player, 3D television, smart television, digital audio recorder, digital audio player, digital picture recorder, digital picture player, digital video recorder, digital video player, storage constituting a data center, device capable of transmitting and receiving information, one of various electronic devices constituting a home network, one of various electronic devices constituting a computer network, one of various electronic devices constituting a telematics network, radio frequency identification (RFID) device, or one of various components constituting a computing system, etc.

The host system 1000 may include at least one operating system 1100, and the operating system 1100 may manage and control overall functions and operations of the host and provide interactions between a user using the memory system 1, and the host.

Here, the operating system 1100 may support functions and operations corresponding to objects and purposes of use of the user, and be divided into, for example, a general operating system and a mobile operating system according to the mobility of the host. Further, the general operating system of the operating system 1100 may be divided into a personal operating system and an enterprise operating system according to user environments, and for example, the personal operating system characterized in supporting service offer functions for general users, includes windows, chrome, etc., and the enterprise operating system characterized in securing and supporting high performance includes windows server, linux, unix, etc.

The mobile operating system of the operating system 1100 may be a system characterized in supporting mobile service offer functions and system power save functions for users, and including android, iOS, windows mobile, etc. In an example embodiment, the host may include a plurality of operating systems, and also execute operating systems to perform operations with the memory system 1 corresponding to a user request. Here, the host may transmit a plurality of commands, i.e., the user request, to the memory system 1, and the memory system 1 may perform operations corresponding to the commands, i.e., the user request.

Read and write requests of the host system 1000 may be performed on a file basis. That is, through a file read READ_F request and a file write WRITE_F request, data may be stored in the storage system 2000 from the host system 1000, or data stored in the storage system 2000 may be read to the host system 1000.

The storage system 2000 may be implemented as, for example, a personal computer (PC), a data server, a network-attached storage (NAS), an Internet of Things (IoT) device, or a portable electronic device. The portable electronic device may include, a laptop computer, mobile phone, smart phone, tablet PC, PDA, enterprise digital assistant (EDA), digital still camera, digital video camera, audio device, PMP, personal navigation device (PND), MP3 player, handheld game console, e-book, wearable device, etc.

The storage system 2000 may include a host interface layer 2100, a flash translation layer 2200, a flash interface layer 2300, and a non-volatile memory 2400.

The host interface layer 2100 may be a logical area where interfacing between the host system 1000 and the storage system 2000 occurs.

The flash translation layer 2200 may be understood as another form of the FTL 311 of FIG. 3, and as a data manager 2210, a data controller 2220, and a garbage collection controller 2230 of FIG. 14 correspond to the data manager 312, the data controller 313, and the garbage collection controller 314 of FIG. 3, respectively, redundant descriptions thereon are omitted.

The host interface layer 2100 and the flash translation layer 2200 may write or read data on a sector basis. That is, according to a read/write request of the host system, the host interface layer 2100 may request a read/write request from the flash translation layer 2200 on a sector basis.

The flash interface layer 2300 may provide an interface between the flash translation layer 2200 and the non-volatile memory 2400. According to an example embodiment, the read READ_P and the write WRITE_P of data may be performed on a page basis, but the erase ERASE_B of data may be performed on a block basis, which may be a characteristic of a flash memory device.

The non-volatile memory 2400 may be understood as the memory device 320 of FIG. 3, and redundant descriptions thereon are omitted.

The memory system 1 according to the inventive concepts may be mounted by using various types of packages. For example, the memory system according to the inventive concepts may be mounted in various forms including Package on Package (PoP), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package, etc.

While the inventive concepts have been particularly shown and described with reference to embodiments thereof, it will be understood that various changes in form and details may be made therein without departing from the spirit and scope of the following claims.

What is claimed is:
1. A storage device comprising:
a memory device including a plurality of memory blocks, the memory blocks including a plurality of pages;
a data controller configured to,
receive, from a host, data to be written to the plurality of pages and a stream identifier assigned by the host to the data, the host having assigned the stream identifier to the data prior to transmitting the data to the storage device, and
selectively change the stream identifier assigned by the host based on an age of the data representing a frequency of update on the data on one of the plurality of memory blocks or one of the plurality of pages by,
changing the stream identifier from the stream identifier assigned by the host to a stream identifier assigned by the data controller, in response to the age of the data being greater than or equal to a first threshold value, the stream identifier assigned by the data controller being different from the stream identifier assigned by the host, and
maintaining the stream identifier assigned by the host to the data, in response to the age of the data being less than the first threshold value; and
a garbage collection controller configured to classify the data based on the stream identifier assigned by the host or the data controller to generate a classification result such that, when the age of the data is greater than or equal to the first threshold value, the classification result is based on the stream identifier assigned by the data controller, and to control a garbage collection operation of the memory device based on the classification result.

2. The storage device of claim 1, wherein the data controller is configured to change the stream identifier assigned by the host to a first stream identifier corresponding to cold data based on the age of the data being greater than or equal to the first threshold value.

3. The storage device of claim 1, wherein the data controller is configured to,
change the stream identifier assigned by the host to a first stream identifier based on the age of the data being greater than or equal to the first threshold value,
change the stream identifier assigned by the host to a second stream identifier based on the age of the data being less than the first threshold value and greater than or equal to a second threshold value, and
change the stream identifier assigned by the host to a third stream identifier based on the age of the data being less than the second threshold value.

4. The storage device of claim 3, wherein the first stream identifier corresponds to cold data, the second stream identifier corresponds to warm data, and the third stream identifier corresponds to hot data.

5. The storage device of claim 1, wherein the garbage collection controller is configured to classify data corresponding to a first stream identifier into a first data group.

6. The storage device of claim 1, wherein
each of the plurality of memory blocks includes at least one page, and
the garbage collection controller is configured to rearrange, based on a number of pages in which data corresponding to a first stream identifier is stored being greater than or equal to a first threshold value, the pages in which the data corresponding to the first stream identifier is stored in at least one of the plurality of memory blocks.

7. The storage device of claim 1, wherein the data controller is configured to generate the age of the data by using first timestamp information of the memory device at a time point when the data is stored in the memory device, and second timestamp information of the memory device at a current write time point when the data controller accesses the data stored in the memory device.

8. The storage device of claim 7, wherein the data controller is configured to determine whether to change the stream identifier assigned by the host based on a difference between a host write amount at the current write time point, and a host write amount at the time point when the data is stored in the memory device.

9. The storage device of claim 7, wherein the data controller is configured to determine whether to change the stream identifier assigned by the host based on a difference between an erase count at the current write time point, and an erase count at the time point when the data is stored in the memory device.

10. The storage device of claim 7, wherein the data controller is configured to determine whether to change the stream identifier assigned by the host based on a time difference between the current write time point and the time point when the data is stored in the memory device.

11. A storage device comprising:
a memory device including a plurality of memory blocks, the plurality of memory blocks including a plurality of pages;
a data manager configured to,
receive, from a host, data to be written to the plurality of pages and N stream identifiers assigned by the host to the data, the host having assigned the stream identifiers to the data prior to transmitting the data to the storage device, and
consolidate the stream identifiers received from the host into M consolidated stream identifiers, where M is less than N;
a data controller configured to selectively change the consolidated stream identifiers to new stream identifiers assigned by the data controller, based on an age of the data representing a frequency of update on the data on one of the plurality of memory blocks or one of the plurality of pages; and
a garbage collection controller configured to classify the data based on the new stream identifiers to generate a classification result such that, when the age of the data is greater than or equal to a first threshold value, the classification result is based on the new stream identifiers assigned by the data controller, and to control a garbage collection operation of the memory device based on the classification result.

12. The storage device of claim 11, wherein the data controller is configured to change a respective one of the consolidated stream identifiers to a first new stream identifier corresponding to cold data based on the age of the data being greater than or equal to the first threshold value.

13. The storage device of claim 12, wherein each of the plurality of memory blocks includes at least one page, and
the garbage collection controller is configured to count the number of pages in which data corresponding to the first new stream identifier is stored.

14. The storage device of claim 13, wherein the garbage collection controller is configured to rearrange, based on the number of counted pages being greater than or equal to a second threshold value, the pages in which the data corresponding to the first new stream identifier is stored in at least one of the plurality of memory blocks.

15. The storage device of claim 11, wherein the data controller is configured to generate the age of the data by using timestamp information of the memory device at a time point when the data is stored in the memory device, and timestamp information of the memory device at a current write time point when the data controller accesses the data stored in the memory device.

16. An operating method of a storage device including a memory device, the method comprising:
receiving, from a host, data and a stream identifier assigned by the host to the data, the host having assigned the stream identifier to the data prior to transmitting the data to the storage device;
selectively changing the stream identifier assigned by the host based on an age of the data representing a frequency of update on the data by,
changing the stream identifier from the stream identifier assigned by the host to a stream identifier assigned by the storage device, in response to the age of the data being greater than or equal to a first threshold value, the stream identifier assigned by the storage device being different from the stream identifier assigned by the host, and
maintaining the stream identifier assigned by the host to the data, in response to the age of the data being less than the first threshold value;
classifying the data based on the stream identifier assigned by the host or the storage device to generate a classification result such that, when the age of the data is greater than or equal to the first threshold value, the classification result is based on the stream identifier assigned by the storage device; and performing a garbage collection operation of the memory device based on a the classification result.

17. The operating method of claim 16, wherein the selectively changing the stream identifier assigned by the host comprises:

comparing the age of the data to the first threshold value; and changing the stream identifier assigned by the host to a first stream identifier corresponding to cold data based on the age of the data being greater than or equal to the first threshold value.

18. The operating method of claim 17, wherein the classifying of the data comprises:

counting the number of pages in which data corresponding to the first stream identifier is stored;

comparing the number of counted pages to a second threshold value; and rearranging, based on the number of counted pages being greater than or equal to the second threshold value, the pages in which the data corresponding to the first stream identifier is stored.

19. The operating method of claim 16, wherein the age of the data is generated by using timestamp information of the memory device at a time point when the data is stored in the memory device, and timestamp information of the memory device at a current write time point when the storage device accesses the data stored in the memory device.

* * * * *